(12) United States Patent
Teplitsky et al.

(10) Patent No.: US 11,084,937 B2
(45) Date of Patent: Aug. 10, 2021

(54) METHOD OF OBTAINING CARBON CONTAINING MATERIAL FROM RECYCLABLE TIRES AND RUBBER PRODUCTS

(71) Applicant: Alexander Teplitsky, Netanya (IL)

(72) Inventors: Alexander Teplitsky, Netanya (IL); Evgeniy Dzyura, Dnipro (UA)

( * ) Notice: Subject to any disclaimer, the term of this patent is extended or adjusted under 35 U.S.C. 154(b) by 0 days.

(21) Appl. No.: 17/045,777

(22) PCT Filed: Mar. 5, 2019

(86) PCT No.: PCT/IB2019/000374
§ 371 (c)(1),
(2) Date: Oct. 7, 2020

(87) PCT Pub. No.: WO2019/202387
PCT Pub. Date: Oct. 24, 2019

(65) Prior Publication Data
US 2021/0163755 A1    Jun. 3, 2021

(30) Foreign Application Priority Data
Apr. 18, 2018  (UA) .............................. a 2018 04242

(51) Int. Cl.
*C09C 1/48*    (2006.01)
*B29B 17/02*   (2006.01)
*B29B 17/04*   (2006.01)
*C10B 57/06*   (2006.01)
*C10B 47/44*   (2006.01)
*C10B 53/07*   (2006.01)

(52) U.S. Cl.
CPC .............. *C09C 1/482* (2013.01); *B29B 17/02* (2013.01); *B29B 17/0412* (2013.01); *C09C 1/487* (2013.01); *C10B 47/44* (2013.01); *C10B 53/07* (2013.01); *C10B 57/06* (2013.01); *B29B 2017/0468* (2013.01); *B29B 2017/0496* (2013.01)

(58) Field of Classification Search
CPC ..................................................... C09C 1/482
See application file for complete search history.

(56) References Cited

U.S. PATENT DOCUMENTS

2014/0294686 A1    10/2014  Susenko

FOREIGN PATENT DOCUMENTS

| CN | 106350092 | 1/2017 |
| TW | 462 984 B | 11/2001 |
| WO | WO 02/26914 A2 | 4/2002 |
| WO | WO 2011/010323 A1 | 1/2011 |

*Primary Examiner* — Stuart L Hendrickson

(57) ABSTRACT

A method for obtaining carbon-containing material from recyclable tires and rubber products, by mechanically crushing a raw material, from recycled tires in a shredder, supplying a charge to a reactor at temperature, removing gaseous pyrolysis products from the reactor, followed by condensing liquid products, unloading solid residue from the reactor and cooling it, feeding the cooled residue into a crusher, coarsely crushing the solid residue, removing metal from the crushed solid residue in a magnetic separator.

1 Claim, 1 Drawing Sheet

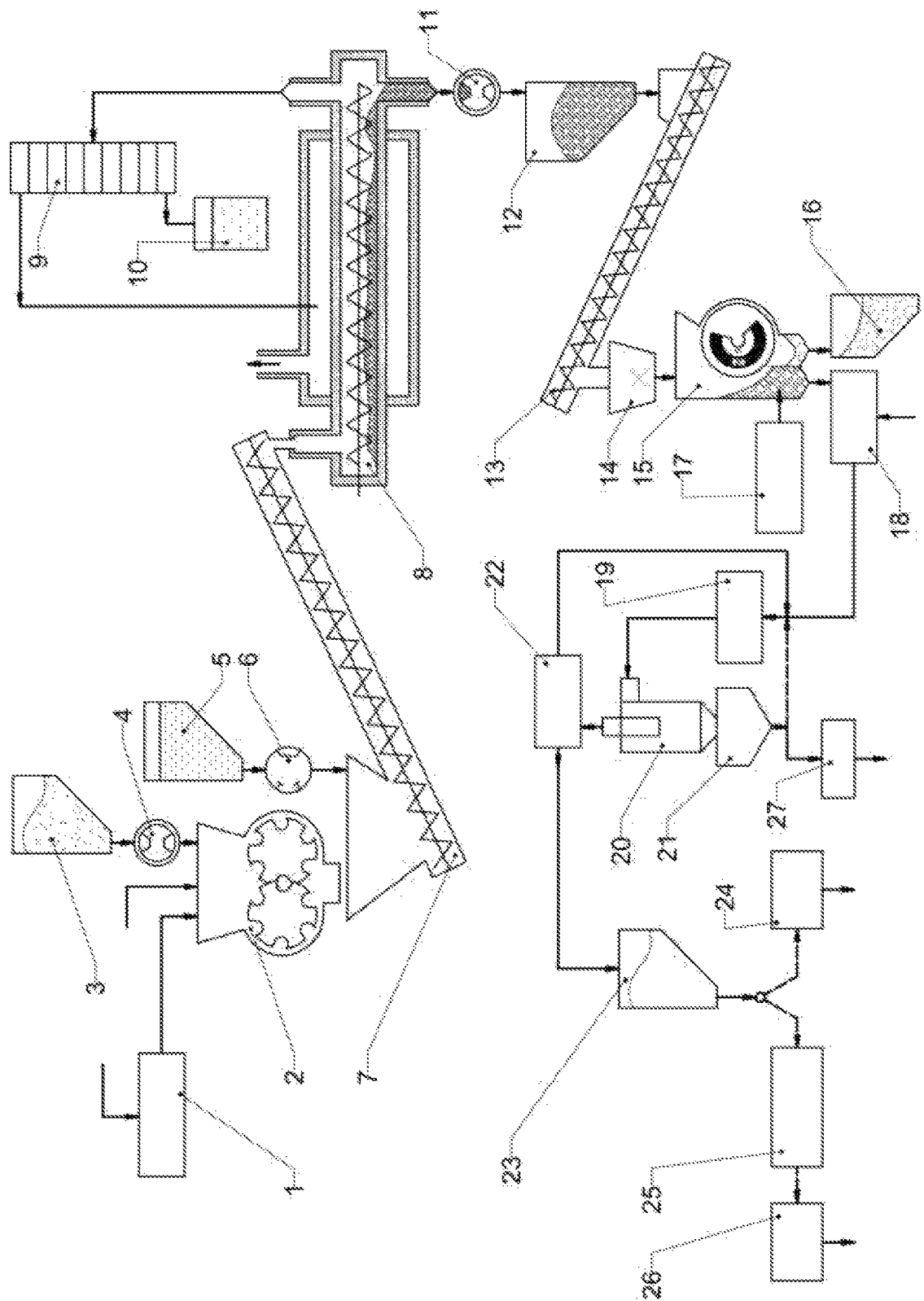

_US 11,084,937 B2_

METHOD OF OBTAINING CARBON CONTAINING MATERIAL FROM RECYCLABLE TIRES AND RUBBER PRODUCTS

FIELD OF THE INVENTION

This invention relates to the field of recycling and recovering raw materials from rubber products. It can be used when recycling worn automobile tires or other rubber products to obtain carbon-containing material and other products.

BACKGROUND OF THE INVENTION

Worn tires and various rubber products as products of human activities impacts environment badly. Moreover, their share in environment pollution is rather high.

Recycling of the utilized products is an important area of reducing environment pollution and obtaining new materials recovered while recycling to be further used in manufacturing new products.

Rubber products is a significant source of raw materials, wherein worn tires make up to 90% of this type of the secondary raw materials.

However, the properties of tires that provide their durability, long life and safety during their exploitation make worn tires problematic for recycling.

Recycling automobile tires and other rubber products using pyrolysis with the formation of gaseous products and solid residue has become widespread.

Gaseous pyrolysis products are used as an energy source, and a solid carbon residue of up to 30% of the tire weight is the most often secondary waste.

Thus, an environmentally important and economically relevant problem is providing efficient recycling technology, where a carbon-containing product can be obtained from the solid residue of pyrolysis, and which can be used in manufacturing new tires.

The known method of extracting carbon black and hydrocarbons from used tires includes splitting tires into fragments less than 1.5 inches; pyrolysis of the fragments in a reaction vessel for pyrolysis at a temperature of 750 to 1800 degrees Fahrenheit and in oxygen-limited hydrocarbon vapors at pressure of 1 to 20 PSIA for 90 minutes in order to obtain a solid phase and a vapor phase; obtaining a separate high-boiling condensate process stream from a portion of said vapor phase in the said reaction vessel; distilling a portion of the said condensate back to the indicated fragments; fractionating the second part of the specified vapor phase to obtain pyrolysis oil and gas; processing the solid phase after its exit from the reaction vessel for pyrolysis which includes: crushing in a jet mill with a stream of supplied air; passing the air stream exiting the mill through a mechanical separator to produce a waste stream of garbage particles and a stream of air containing carbon black particles; passing a stream of air with carbon black particles through a cyclone separator to remove 80-90% of relatively coarse carbon black particles and to get an air stream of a thin product containing relatively finer carbon black particles [«Process for recovering carbon black and hydrocarbons from used tires» "U.S. Pat. No. 4,250,158 A" (INTENCO INC) (US) C01B31/02; C09C1/48; 10 Feb. 1981] [1].

The other known method of making carbon black and hydrocarbons from worn tires includes cutting tires into fragments; pyrolysis of the fragments in a pyrolysis reaction vessel at a temperature, pressure and reaction time sufficient for the fragments to dissociate into a vapor phase and a solid phase; recirculating a part of the solid phase back to the reactor; the specified stage of pyrolysis includes indirect internal heating of the fragments in the reaction vessel filled with the molten salt; obtaining carbon black from the solid phase; and processing the specified steam hydrocarbon production phase ["Process for recovering carbon black and hydrocarbons from used tires" U.S. Pat. No. 4,284,616A (INTENCO INC) (US) C01B31/02; C0B31/00; C09C1/48; Aug. 18, 1981] [2].

A disadvantage of the known methods is that the carbon-containing material obtained during the recycling process has a low surface activity and cannot be used as a filler in manufacturing new tires.

In addition, it has many negative impurities.

Use of such material as a filler does not provide new tires with the required strength and operational properties.

A method, closest in its purpose, technical essence and the achieved result, is the method of obtaining carbon-containing material from recyclable tires and/or rubber products, including:

mechanical crushing of recycled tires and/or rubber products in a grinder and obtaining a charge;

feeding the furnace charge of crushed tire elements into a reactor and pyrolysis with the formation of gaseous products and a solid residue;

continuous removing gaseous pyrolysis products from the reactor followed by condensation of liquid products into a condensation column of liquid fractions, discharging the solid residue from the reactor and cooling it in a hopper cooler:

coarse crushing of the solid residue in the crusher followed by metal removing in a magnetic separator U.S. Pat. No. 7,416,641B2 (DENISON GILBERT W (US); FEDERAL RECYCLING TECHNOLOGY, INC (US)) C10B 21/20; 26 Aug. 2008] [3].

In the known method [3], to process the solid residue of pyrolysis and produce carbon-containing material, untreated after pyrolysis technical carbon is ground in a jet mill and cleaned in a pneumatic system.

The disadvantage of this method is that the obtained carbon-containing material has a low surface activity and contains a large amount of impurities that excludes the use of the carbon-containing material obtained as a filler when producing new automobile tires for the reason that it will reduce their strength and operating characteristics.

SUMMARY OF THE INVENTION

The objective of this invention is to develop a method of recycling utilized tires and/or rubber products, the use of which would eliminate harmful impurities, increase the surface activity of the carbon-containing material that will allow to use the obtained carbon-containing material as a filler when manufacturing new tires.

This objective is achieved by the method of obtaining carbon-containing material from recyclable tires and/or rubber products, including:

mechanically crushing raw materials from recycled tires and/or rubber products in a shredder and obtaining a charge;

supplying the charge to a reactor and pyrolyzing with the formation of vapor-gas products and a solid residue;

continuously removing gaseous pyrolysis products from the reactor, followed by condensing liquid products into a condensation column of liquid fractions, unloading the solid residue and cooling said residue;

coarsely crushing the solid residue and removing metal from the crushed solid residue in a magnetic separator, according to the Invention before mechanical crushing, metal bead rings are removed from the recycled tires;

before supplying the charge into the reactor, a coking inhibitor is introduced in the charge in the amount of 3-20% by weight of the charge and consisting of polyethylene, polypropylene, polyethylene terephthalate, polystyrene, and a liquid inhibitor component polymethylsiloxane, in the amount of 0.5-1.0% by weight of the inhibitor, the pyrolysis of the charge in the reactor is carried out at a pyrolysis temperature of from 350° C. in the main working zone of the reactor to 600° C. at the exit of the reactor, the removal of metal from the crushed solid residue in the magnetic separator is performed until the metal content is not more than 0.1% of the total mass of the solid residue, after which the solid residue is processed and activated with superheated steam at a temperature of 250-350° C. in a steam chamber, and the solid residue is ground in a vortex mill;

two-stage classification of the solid residue is carried out at an air elutriator, from which the fine fraction is sent into an electrical mass classifier for further fine classification, and the large fraction screenings are sent to a hopper and further, to a thermal furnace, in which residual carbon is removed and an additional target product, which is a mineral component, is produced, or are sent for re-grinding into the vortex mill, where the fine fraction of the solid residue in the electrical mass classifier is divided into fraction F, which is smaller than 45 μm (F1<45 μm), and fraction F2 which is larger than 45 μm (F2>45 μm);

the solid residue powder of the F2 fraction, which is larger than 45 μm (F2>45 μm) is returned from the electrical mass classifier into the vortex mill for repeated fine grinding;

the powder fraction F1 smaller than 45 μm (F1<45 μm) is sent from the electrical mass classifier to a storage hopper and then to a packaging machine or granulator The method obtained by improving the preparation of the charge, optimizing the processes of pyrolysis and removing metal from the crushed solid residue, optimizing the complex of technological operations for final processing of the solid residue through its activation, fine grinding, classification and removal of metallic impurities, allows to obtain carbon-containing material with high level of surface activity and to minimize the content of harmful impurities, that in its turn allows to use it as a filler when producing new tires, as it provides the required level of their strength and operational factors.

BRIEF DESCRIPTION OF THE DRAWINGS

FIG. 1 depicts the invention that is explained by detailed description of its implementation with reference to the drawing, which presents a diagram of the installation for producing a carbon-containing material, which contains:
1. tire bead ring removal machine
2. shredder
3. solid component inhibitor hopper
4. solid component inhibitor dosing apparatus
5. liquid component inhibitor hopper
6. liquid component inhibitor dosing apparatus
7. conveyor
8. pyrolysis reactor
9. liquid fraction condensation column
10. liquid fraction hopper
11. solid pyrolysis residue dosing apparatus
12. cooling hopper
13. conveyor
14. crusher
15. magnetic separator
16. metal storage hopper
17. metal detector
18. vaporizing chamber
19. vortex mill
20. air elutriator
21. hopper
22. electrical mass classifier
23. storage hopper
24. apparatus for packing carbon powder material
25. granulator
26. apparatus for packing granules of carbon-containing material
27. thermal furnace The method of obtaining carbon-containing material from recyclable tires and/or rubber products is described below.

Metal bead rings are removed from the recycled tires on a tire bead ring removal machine 1 that eliminates expenditures for their crushing and removing the crushed parts.

Then, recyclable tires and/or rubber products are fed to a shredder 2 to obtain a charge.

A solid coking inhibitor component is also fed to the shredder 2 from a solid component inhibitor hopper 3 through a solid component inhibitor dosing apparatus 4.

The crushed rubber-containing raw material and the solid component of the coking inhibitor are fed to a loading hopper of a conveyor 7 from the shredder 2

A liquid component of the coking inhibitor is fed to the loading hopper of the conveyor 7 from a liquid component inhibitor hopper 5 through a liquid component inhibitor dosing apparatus 6.

The coking inhibitor is 3-20% by weight of the charge and consists of solid and liquid components.

The solid component of the charge is any mass combination of thermoplastic linear polymers from the group: polyethylene, polypropylene, polyethylene terephthalate, polystyrene.

The liquid component is polymethylsiloxane in the amount of 0.5-1.0% of the total weight of the inhibitor.

The use of the coking inhibitor allows to reduce significantly or completely eliminate the formation of coke on the carbon particles during pyrolysis in a pyrolysis reactor 8 that provides production of the carbon-containing material with high surface activity.

The prepared charge together with the coking inhibitor is fed to the pyrolysis reactor 8 by the conveyor 7.

Pyrolysis in the pyrolysis reactor 8 is carried out in the main operating zone of the reactor at a temperature of 350° C. and up to 600° C. at the exit of the reactor.

This provides an effective thermal decomposing of the charge and obtaining a solid residue with a given content of volatile components.

In the process of pyrolysis gaseous products are continuously removed from the pyrolysis reactor 8 followed by condensation of liquid products in the fluid fraction condensation column 9.

The solid residue is discharged through a solid pyrolysis residue dosing apparatus 11 to a cooling hopper 12 where it is cooled to the ambient temperature.

Condensate of the gaseous products is sent to the liquid fraction hopper 10, and the combustible gas is fed to the pyrolysis furnace of the pyrolysis reactor 8 for combustion and to maintain the optimum pyrolysis temperature.

The solid residue is conveyed by a conveyor 13 from the cooling hopper 12 to a crusher 14 for crushing it coarsely to a fraction of 1-5 mm, and then it is transported to a magnetic separator 15. In the magnetic separator 15, the metal is removed from the crushed solid residue up to 0.1% of metal content of the total weight of the solid residue. The amount of metal in the crushed sold residue is controlled by metal detector 17.

Metal content of more than 0.1% of the total weight of the solid residue does not allow to provide the rubber, manufactured with the use of such carbon-containing material, one of its standardized operational factors such as "rubber aging".

The metal is sent from the magnetic separator 15 to the metal storage hopper 16, and the crushed solid residue is fed to the vaporizing chamber 18.

In the vaporizing chamber 18, the solid residue is activated by superheated steam at a temperature of 250-350° C.

This provides the final cleaning of the surface and pores of the carbon particles from the remaining slag that leads to an increase of the effective active surface.

Then, the activated solid residue is fed to fine grinding in a vortex mill 19, after which the finely ground activated solid residue is fed to a two-stage classification in an air elutriator 20.

Fine and light fractions are fed from the air elutriator 20 to an electrical mass classifier 22 for fine classification, and coarse and heavy fractions are sent to a hopper 21.

Screening out of the hopper 21 is fed:
either to a thermal furnace 27, where the residual carbon is removed and an additional target product is obtained—a mineral component consisting of zinc oxide (ZnO) and cobalt oxide (Co2O3),
or to the vortex mill 19 for repeated fine grinding (recycling).

Then, the final fine classification is done in the electrical mass classifier 22 for fraction F1 less than 45 μm (F1<45 μm) and fraction F2, more than 45 μm (F2>45 μm).

Experiments have shown that the presence of particles in the carbon-containing material of more than 45 μm (F1<45 μm) does not allow to obtain rubber with the strength characteristics necessary for manufacturing tires.

The solid residue powder of the F2 fraction is more than 45 μm (F2>45 μm) is sent from the electrical mass separator 22 to the vortex mill 19 for repeated fine grinding.

The powder of the solid residue of fraction F1 less than 45 μm (F1<45 μm) commercial carbon-containing material, is fed to a storage hopper 23, and then to a granulator 25 and apparatus for packing carbon powder material 24, and then to an apparatus for packing granules of carbon-containing material.

Prepacked carbon-containing material is sent to consumers or to the warehouse

DETAILED DESCRIPTION OF THE EMBODIMENTS

Metal bead rings were removed from the recycled tires on a tire bead ring removal machine 1. Then, recyclable tires and/or rubber products were fed to the shredder 2 for crushing. At the same time a solid inhibitor component was also fed in the amount of 10-12% of the total weight to the shredder 2 from a solid component inhibitor hopper 3 through a solid component inhibitor dosing apparatus 4.

The solid inhibitor component was represented in a form of polyethylene and polypropylene wastes of the film products The crushed rubber-containing raw material was fed to a pyrolysis reactor 8 by a conveyor 7, where liquid polymethylsiloxane in the amount of 1% of the total mass of the loaded polyethylene and polypropylene wastes was fed from a liquid component inhibitor hopper 5 through a liquid component inhibitor dosing apparatus 6.

The prepared charge was sent by the conveyor 7 to the rotating pyrolysis reactor 8 heated by the furnace gases, having two heating zones.

The temperature in the main heating zone of the pyrolysis reactor 8 was maintained at 370° C., and at the exit of the pyrolysis reactor 8—600° C. that fully provided the release of liquid and gaseous pyrolysis products In the process of pyrolysis, gaseous products were continuously removed from the pyrolysis reactor 8 followed by condensation of liquid products in the liquid fraction condensation column 9, and the solid residue was discharged through the solid pyrolysis residue dosing apparatus 11 and sent for cooling into the cooling hopper 12.

The condensate of the gaseous products was fed to the liquid fraction hopper 10, and the combustible gas was fed to the furnace of the pyrolysis reactor 8 for combustion and maintaining the optimum temperature of pyrolysis in the pyrolysis reactor 8.

Next, the solid residue of pyrolysis in the cooling hopper 12 was cooled to 50° C., after which it was transported by the conveyor 13 to the crusher 14 for preliminary coarsely crushing to a particle size of less than 5 mm and then to the two-stage magnetic separator 15 in order to remove iron to the specified content (not more than 0.1%) that was controlled by the metal detector 17.

The separated iron-containing component of the solid residue was sent to the metal storage hopper 16.

Next, the carbon-containing component of the solid residue was processed in the vaporizing chamber 18 in a stream of the superheated steam with a temperature of 300° C., and then cooled to 40° C. and fed into the vortex mill 19 for fine grinding.

After fine grinding, the carbon-containing material from the vortex mill 19 was fed to the air elutriator 20, where the heavy mineral components were partially removed.

Then, the powdered product was fed to the electrical mass classifier 22, where the final fine classification was carried out for fraction F1 less than 45 μm (F1 <45 μm) and fraction F2, more than 45 μm (F2>45 μm).

The solid residue powder of the F2 fraction more than 45 μm (F2>45 μm) was returned from the electrical mass separator 22 to the vortex mill 19 for repeated fine grinding.

As the result of fine classification in the electrical mass classifier 22, a powder of the solid residue of fraction F1 was obtained, less than 45 μm (F1<45 μm).

Thus, a carbon-containing material with an average particle size of 5 to 10 μm is obtained, which is fed to the storage hopper 23 and then to the packaging in the apparatus for packing carbon powder material 24 or to the granulator 25.

The prepacked product is delivered to consumers or to the warehouse.

The quality indicators of the obtained carbon-containing material of the test samples in accordance with ASTM methods were as following:

| | |
|---|---|
| iodine adsorption number, g/kg (D1510). | 78.4, |
| total area of nitrogen adsorption (NSA), m2 g (D6566) | 64.5, |
| specific surface area according to CTAB, m2/g (D3765) | 66.0, |

-continued

| | |
|---|---|
| oil absorption number, cm3/100 g (D2714) | 81.2, |
| power of coloring, units (D3265) | 60.1, |
| the transmittance of the toluene extract, % (D1618) | 98.0, |
| pH value, units (D1512) | |

The results of physical and mechanical tests and experiments of standard rubber based on styrene-butadiene rubber SBR-1500, containing 40 wt. including the obtained carbon-containing material was as follows:

| | |
|---|---|
| nominal stress at elongation of 300%, MPa | 12.0, |
| nominal tensile strength, MPa | 18.0, |
| percent elongation, % | 423, |
| tear resistance, kN/m | 42, |
| Shore hardness, arb. units | 60. |

Physical and mechanical factors of tire rubber carcass tested samples of mixtures containing standard carbon black and the obtained carbon-containing material demonstrated almost identical results.

The given evidences and information have proved the industrial applicability of the proposed method for producing carbon-containing material from worn tires and/or rubber products, when the carbon-containing material obtained can be effectively used and completely replace low-active grades of standard carbon black and partially replace semi-active grades in manufacturing new tires and rubber products.

What is claimed is:

1. A method of obtaining carbon-containing materials from recycled tires and/or rubber products, including
mechanically crushing raw materials from recycled tires and/or rubber products in a shredder,
supplying a charge to a reactor and pyrolyzing with the formation of vapor-gas products and a solid residue,
continuously removing gaseous pyrolysis products from the reactor, followed by condensing liquid products into a condensation column of liquid fractions, unloading the solid residue and cooling said residue,
coarsely crushing the solid residue and removing metal from the crushed solid residue in a magnetic separator characterized in that
before mechanical crushing, metal bead rings are removed from the recycled tires;
before supplying the charge into the reactor, a coking inhibitor is introduced in the charge in the amount of 3-20% by weight of the charge and selected from the group consisting of polyethylene, polypropylene, polyethylene terephthalate, polystyrene, and a liquid inhibitor component polymethylsiloxane, in the amount of 0.5-1.0% by weight of the inhibitor, the pyrolysis of the charge in the reactor is carried out at a pyrolysis temperature of from 350° C. in the main working zone of the reactor to 600° C. at the exit of the reactor;
the removal of metal from the crushed solid residue in the magnetic separator is performed until the metal content is not more than 0.1% of the total mass of the solid residue, after which the solid residue is processed and activated with superheated steam at a temperature of 250-350° C. in a steam chamber, and the solid residue is ground in a vortex mill;
two-stage classification of the solid residue is carried out at an air elutriator, from which the fine fraction is sent into an electrical mass classifier for further fine classification, and the large fraction screenings are sent to a hopper and further, to a thermal furnace, in which residual carbon is removed and an additional target product, which is a mineral component, is produced, or are sent for re-grinding into the vortex mill, where the fine fraction of the solid residue in the electrical mass classifier is divided into fraction F, which is smaller than 45 μm (F1<45 μm), and fraction F2 which is larger than 45 μm (F2>45 μm);
the solid residue powder of the F2 fraction, which is larger than 45 μm (F2>45 μm) is returned from the electrical mass classifier into the vortex mill for repeated fine grinding;
the powder fraction F1 smaller than 45 μm (F1<45 μm) is sent from the electric mass classifier to a storage hopper and then to a packaging machine or granulator.

* * * * *